United States Patent [19]
Gayner et al.

[11] 3,747,797
[45] July 24, 1973

[54] LAMINATED CONTAINER WALL

[75] Inventors: Herbert Gayner, Monroeville; David A. Smith, Penn Hills, both of Pa.

[73] Assignee: Aluminum Company of America, New Kensington, Pa.

[22] Filed: Oct. 19, 1971

[21] Appl. No.: 190,559

[52] U.S. Cl............................ 220/53, 220/54, 220/64
[51] Int. Cl............................................. B65d 17/20
[58] Field of Search....................... 220/53, 54, 90.6, 220/64

[56] References Cited
UNITED STATES PATENTS

| 3,510,022 | 5/1970 | Heller | 220/90.6 X |
| 3,610,462 | 10/1971 | Saunders | 220/54 |
| 3,632,461 | 1/1972 | Gayner | 220/53 X |

Primary Examiner—George T. Hall
Attorney—Arnold B. Silverman

[57] ABSTRACT

A method of fabricating a laminated metal container wall provided with an opening device including providing a metal sheet having a layer of protective material secured thereto by means of an adhesive selected from the group consisting of epoxy, polyester and polyurethane. The protective material is selected from a group consisting of a copolymer of a polyolefin and ethylene and ionomers of polyolefin. A preferred form of copolymer has polypropylene as the polyolefin employed with the ethylene. A preferred polypropylene ethylene copolymer may have an ethylene content of about 2 to 10 percent. The laminated metal sheet is scored to define a removable sector therein. The scoring is preferably effected to such a depth as to provide residual metal along the score line of about 2 to 6 mils. Simultaneously with the scoring operation, reducing the thickness of the layer of protective material without penetrating entirely through the layer. The protective layer may have an initial thickness of about 1.5 to 4 mils and preferably about 2.5 to 3.5 mils.

A laminated metal container wall having a score line defined removable sector. An adhesive material secured to one surface of the container wall. A continuous layer of protective material secured to the metal panel portion by means of the adhesive. The protective layer may have a thickness of about 1.5 to 4 mils and is selected from a group consisting of a copolymer and a polyolefin and ethylene and ionomers of polyolefins.

4 Claims, 5 Drawing Figures

LAMINATED CONTAINER WALL

BACKGROUND OF THE INVENTION

1. Field of the Invention

This invention relates to laminated container walls having integral opening devices and, more specifically, this invention relates to a method of fabricating such a laminated container wall which is adapted to resist undesired corrosive attack upon the metal component of the container wall, without requiring repair coating of the metal surface after scoring to define a removable sector and/or rivet formation.

2. Description of the Prior Art

One of the conventional container wall systems which has attained great commercial acceptance in recent years provides an integral opening device which facilitates fracture of a portion of the container wall to permit access to the container contents. In one of the more popular structures, a metal wall is provided with a score line defined removable sector which is adapted to be either severed and removed from the container wall or partially severed and displaced sufficiently to permit access to the contents of the container.

It has been known to employ a pull tab in the form of a lever which provides the user with a mechanical advantage in initiating score line fracture during opening of the container. Such lever tabs are frequently attached within the score line defined removable sector by means of an integrally formed rivet which is established within the removable sector by creating an upwardly directed hollow embossment and reforming the same.

In the conventional system for fabricating such container walls, the undersurface of the wall is generally provided with a suitable protective organic coating. This protective coating insulates the metal container wall from potentially destructive corrosive attack by the container contents. In addition, where dissimilar metals are employed in the container end wall and the remainder of the container, such as is true where aluminum can ends are secured to tinplated steel can bodies, the coating prevents galvanic corrosion. Such corrosion could result were the aluminum permitted to function as a sacrificial anode with respect to the tinplate can body. During the application of the severe compressive impact forces which are applied to the metal panel when it is scored and when the rivet is formed, conventional protective coatings are fractured and permit undesired exposure of the metal surface. As a result, the standard commercial practice has been to repair the damage done to the coating during this converting stage by applying additional coating material after scoring and/or rivet forming have been completed. Such an approach not only involves the rather cumbersome and inefficient need to employ an additional fabricating step in order to repair the damaged coating, but also involves the uneconomic use of additional material and equipment.

In U.S. Pat. application Ser. No. 825,164, filed May 16, 1969, now U.S. Pat. No. 3,632,461 entitled "Laminated Container Wall Structure," there is disclosed an approach to avoiding the need to repair coat container walls having an integral opening device. This is accomplished by employing certain materials which are adhesively bonded to the metal sheet and are adapted to withstand the scoring and rivet forming forces without experiencing excessive deterioration. Included within the materials suggested for such use are homopolymers such as polyethylene and polypropylene. While this approach has, in general, proved acceptable, there has remained a need for improved structures which will eliminate the need for the conventional repair coating and provide superior resistance to undesired galvanic corrosion and product attack, while permitting ease of opening. In addition, such structures should be capable of withstanding long periods of storage with a wide range of food materials and other products while permitting the use of a single structure with a highly diversified range of products having a wide variety of properties.

SUMMARY OF THE INVENTION

The above-described need has been met by the method and product of this invention. The method of this invention includes providing a metal sheet with a layer of adhesive selected from the group consisting of epoxy, polyester and polyurethane secured to the sheet. A continuous layer of protective material selected from the group consisting of a copolymer of a polyolefin and ethylene and ionomers of polyolefin is secured to the metal sheet by means of the adhesive. The polyethylene-ethylene copolymer which is the preferred material, may be provided with an ethylene content of about 2 to 10 percent by weight, with a further preference being about 2 to 5 percent. The laminated metal sheet is then scored to define a removable sector therein. The scoring is preferably effected to such a depth as to provide residual metal along the score line of about 2 to 6 mils. Simultaneously with the scoring operation, the thickness of the layer of protective material is reduced without penetrating entirely through the layer. This reduction in thickness of the protective material is preferably about 10 to 50 percent of the original thickness. The protective material may have an initial thickness of about 1.5 to 4 mils with the thickness of about 2.5 to 3.5 mils being preferred.

The laminated metal container wall of this invention has a metal panel provided with a score line defined removable sector. An adhesive material, which is preferably selected from the group consisting of epoxy, polyester and polyurethane, is secured to the metal sheet. A continuous layer of protective material, preferably in the form of a film, is secured to the metal panel by means of the adhesive. The protective material is selected from the group consisting of copolymer of a polyolefin and ethylene and ionomers of polyolefin. A preferred polyolefin-ethylene copolymer employs polypropylene as the polyolefin. The protective material preferably has an initial thickness of about 1.5 to 4 mils in regions not underlying the score line, with about 2.5 to 3.5 mils being preferred. The protective material may have a reduced thickness in regions underlying the score line.

It is an object of this invention to provide a method of fabricating a laminated container wall structure which will effectively withstand the severe impact forces and working involved in providing an integral opening device therein, without necessitating the use of repair coating or similar reconstructive procedures.

It is another object of this invention to provide such a method and product thereof wherein the laminated material includes a protective film which will serve as an effective barrier to both galvanic corrosive attack and product attack of the metal container wall by the container contents.

It is yet another object of this invention to provide such a method and laminated container wall wherein the container wall may be provided with an integral opening device by employing substantially conventional procedures without requiring uneconomic use of expensive materials or specialized processes or equipment.

It is another object of this invention to provide such a laminate containing a specific protective material which is resistant to the substantial forces applied during scoring and rivet formation in container wall opening device fabrication and yet will be durable and functional when employed with a wide range of products.

These and other objects of this invention will be more fully understood and appreciated from the following detailed description of the invention on reference to the illustrations appended hereto.

DESCRIPTION OF THE PREFERRED EMBODIMENTS

The term "container wall" and words of similar import as used herein shall refer to a wide range of container wall portions including can ends, closures for bottles and jars and similar walls which are provided with or are adapted to be provided with integral opening devices. The term will be employed for these types of container wall portions regardless of whether they are disposed at what might be considered an end of the container.

Figure 1:
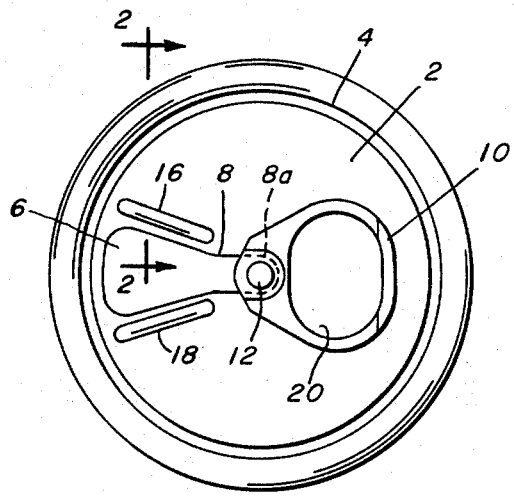
FIG. 1 is a plan view of one form of container wall of this invention having an integral opening device.

Referring now more specifically to FIG. 1, there is shown a container wall, in the form of a can end having a top panel portion 2 and a depending flange 4. A removable sector 6 is defined within a top panel 2 by means of score line 8. While in the form shown, the removable sector 6 is such as to be entirely separable from the top panel 2 upon opening, the invention is, of course, not so limited. The term "removable sector" and words of similar import as used herein shall refer to portions of a container wall which are defined by weakened lines in such a fashion that severance of the weakened or scored line permits access to the contents of the container, regardless of whether the portions are completely removed from the remainder of the container wall or remain attached thereto after establishment of an opening by severance of the weakened lines.

As is shown in FIG. 1, the container wall has a lever pull tab 10 which is secured to the top panel 2 by a fastening means 12 which may be a hollow integral rivet formed from the material of top panel 2 in a conventional manner. The top panel 2 also has a pair of upstanding stiffening ribs 16, 18 disposed on opposite sides of removable sector. In effecting opening of the container wall shown in FIG. 1, the pull tab 10 is grasped at the end where the ring opening 20 is defined, the lever is then raised in order to transmit a score line fracturing force to the score line origin 8a and thereby initiate fracture thereof. Continued application of force to the pull tab 10 results in severance of the remainder of the score line 8.

Figure 2:
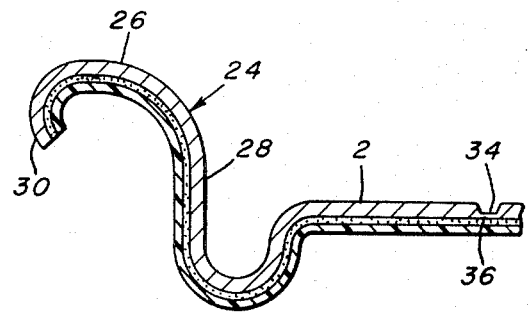
FIG. 2 is a fragmentary cross-sectional view of the container wall shown in FIG. 1 taken through 2—2.

As is shown in FIG. 2, the can end 24 has a central panel 2, an outer flange 26 and a connecting chuck wall 28. The outer flange 26 terminates in a generally downwardly directed flange extension 30. The panel 2 has a weakened or score line 34 which may be provided by any suitable means such as conventional scoring equipment employed in fabricating aluminum container walls. The panel 2 of can end 24 will generally have a metal panel thickness of about 0.009 to 0.0145 inch except for the region 36 underlying the score line 34. The residual sector 36 of the metal underlying score line 34 will generally be of a thickness of about 0.002 to 0.006 inch with 0.0025 to 0.0045 inch being preferred. The residual sector 36 must be sufficiently strong to permit the container wall to maintain its integrity during fabrication, handling, sealing and use with various container contents. The removable sector must be weakened sufficiently to permit ready severance thereof by the user when it is desired to gain access to the container interior. The residual sector 36 must also be sufficiently strong to withstand a wide range of pressure differentials across the removable sector and prevent accidental severance thereof.

While numerous materials may be employed for the container wall panel 2, aluminum, steel and their alloys are among the preferred materials because of their ready formability and high strength. Among the preferred aluminum alloys are the aluminum magnesium alloys (5XXX) and the aluminum manganese (3XXX) alloys. These alloys are particularly advantageous for use in container walls of the type contemplated in this invention when used in the extra hard H19 temper as this provides increased strength at a minimum cost. Two specific preferred alloys for this purpose are 5052-H19 and 5151-H19.

Figure 3:
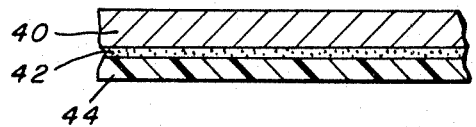
FIG. 3 is an illustration of a form of laminate structure contemplated by this invention.

Referring now to FIG. 3, there is shown a metal container wall 40 which is provided with a removable sector by scoring (not shown in this view). Secured to one surface of the container wall 40, preferably in a substantially continuous covering relationship therewith, is a layer of adhesive material 42 which may be provided by any convenient means. The adhesive is employed to secure protective layer 44 in an effective intimate bonded relationship. This facilitates the protective layer 44 functioning to maximum advantage in resisting destruction of the desired barrier properties during formation of the opening device in the container wall as well as during subsequent prolonged storage of the sealed container.

Among the adhesives which are preferred for purposes of this invention are those selected from a group consisting of epoxy, polyester, and polyurethane. (A suitable epoxy adhesive is that sold under the trade designation Shell ADX57B and a suitable polyurethane is that sold under the trade designation Adcote 102.) The use of the identifying terms employed in defining the group of preferred adhesives is expressly intended to include adhesives which consist primarily of one of these three materials, but also contain certain modifying additives which may be of a conventional nature. For example, the polyurethane adhesive or the polyester adhesive employed in this invention may be improved by employing a modifying epoxy constituent or other additives which modify the adhesive's properties. In addition, it may be desirable with respect to some adhesives to add a small quantity of a catalyst of a type frequently employed with the particular adhesive.

The adhesives are preferably applied in coating form and are applied in quantities of about 1.0 to 5.0 mg/sq. in. with the preferred range being about 1.0 to 3.0 mg/sq. in. In order to effect maximum intimacy of bond it is preferred to cure the adhesive. This may readily be accomplished by heating to a temperature of about 150° to 475°F for a period of about 10 to 60 minutes. In general, it will be convenient in the practice of this invention to apply the adhesive to the metal sheet in the form of a coating or film and subsequently apply and bond the layer of protective layer 44. The protective layer 44 is preferably applied in the form of a film, but may be applied as a continuous coating, if desired.

Referring once again to FIG. 3, there is shown the protective layer 44 which is substantially continuous and is bonded to the container wall 40 by means of adhesive 42. The protective material 44 preferably is selected from the group consisting of copolymers of polyolefin and ethylene and ionomers of polyolefins.

One of the preferred protective materials of this invention is a polyolefin-ethylene copolymer wherein the ethylene content is about 2 to 10 percent, by weight. The preferred range of ethylene constituent in such a copolymer is about 2 to 5 percent ethylene, by weight. One specific form of copolymer which is particularly advantageous is a polypropylene-ethylene copolymer. Various ionomers of polyolefin may also be effectively employed in the practice of this invention. A preferred material within the latter group is polyethylene acrylate.

The protective layer 44 preferably has an initial thickness of about 1.5 to 4 mils, with a thickness of about 2.5 to 3.5 mils being the preferred thickness. In effecting scoring of the metal panel 40, the portion of the protective layer 44 underlying the score line will be thinned by the compressive forces which establish flow of material. This thinning preferably effects a reduction in thickness of about 10 to 50 percent and reduces the strength of the protective layer 44 in these local regions.

Figure 4:
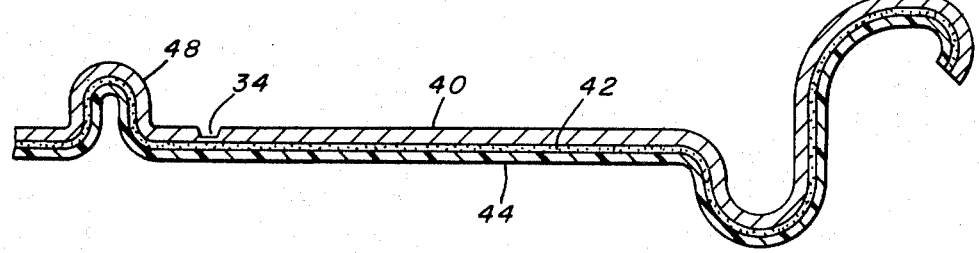
FIG. 4 shows a fragmentary cross-sectional illustration of a container wall in the form of a can end composed of a form of laminate of this invention.

As is shown in FIG. 4, the container wall 40 has been formed into the shape of a can end. The pull tab (not shown) would be placed over the hollow integral rivet 48. The rivet 48 would then be staked in order to effect joinder of the tab and the container wall 40. In forming the end, the scoring operation required to establish score line 34 will result in a very substantial impact force being compressively applied to the entire composite container wall 40 with the pressure along the score line frequently ranging from 100,000 to 300,000 psi. In addition, outward deformation of the container wall 40 during forming of rivet 48 provides substantial stresses in the metal panel 40, as well as the adhesive 42 and protective layer 44. It is essential that the integrity of the protective layer 44 be preserved during such forming operations so as to maintain the desired barrier properties. It is also necessary that the adhesive 42 continue to function after such severe stressing of the metal panel in order to permit effective retention of the protective layer 44 and to provide for efficient opening of the container wall 40 in a manner to be described in greater detail below.

Figure 5:
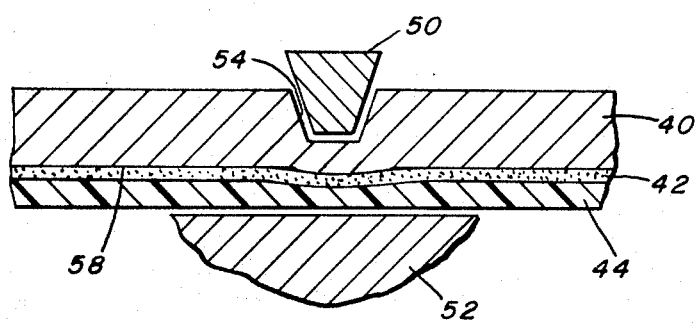
FIG. 5 illustrates a fragmentary cross-sectional illustration of a laminate of this invention showing the scoring tools.

Referring more specifically to FIG. 5, the stresses applied to the laminate structure during scoring will be considered in greater detail. A conventional truncated indenter tool 50 cooperates with an underlying substantially flat anvil 52 in applying compressive force to the container wall 40 during relative closing movement therebetween. For clarity of illustration a gap has been shown between the indenter tool 50 and the score line 54. The rapid downward movement of the indenter tool 50 creates the score line 54 by both severance and physical displacement of material of the metal container wall 40 and transversely outwardly directed metal flow away from the score line 54. The undersurface 58 of container wall 40 is deformed downwardly, during the scoring operation in regions underlying score line 54.

During score line formation, the protective layer 44 will be subjected to thinning in the region generally underlying the score line 54. During the scoring operation the section of the protective layer 44 underlying score line 54 is preferably thinned by about 10 to 50 percent of its initial thickness, while the remaining portions will remain at substantially the original thickness. The laminate is such, however, that the thinning will not be effected to such a depth as to create penetration extending entirely through protective layer 44. Also, the thinning will not be such as to reduce the barrier properties of protective layer 44 to the point where undesired galvanic corrosive action and/or attack of the undersurface 58 of the container wall 40 by the container contents will occur. Also, the adhesive 42 maintains the tenacious bond, preferably substantially continuously between the metal container wall 40 and the protective layer 44.

In establishing the structure of this invention, it will be appreciated that it is a prime object to avoid several undesirable structural characteristics which interfere with effective performance of the container wall. First of all, perforation or undue thinning of the protective layer 44 can lead to galvanic corrosion by permitting a substance which is in contact with both an aluminum container wall and a container wall of a different material, such as tinplated steel, to function as a galvanic anode. This galvanic corrosion can produce undesired interaction of the corrosion product with the container contents. It also can result in complete corrosive failure of the aluminum container wall through its being destroyed as a result of its serving as a sacrificial anode in the galvanic cell. Galvanic corrosion also can contribute to progressive destruction of the adhesive bond between the protective layer 44 and metal panel 40.

Another potential hazard is that the blistering (the formation of voids or gaseous pockets intermediate the metal container wall and the protective layer 44) which is the result of attack on a metal container wall 40 either through galvanic action or attack by the container contents. In this respect it should be noted that food products are frequently highly corrosive in nature. These blisters not only contribute to failure of the protective layer 44, but also tend to contribute to progressive destruction of the adhesive bond between the protective layer 44 and a metal panel 40. These failures can ultimately lead to the above discussed corrosion problems. Finally, openings in the protective layer 44 permit entry of the container contents into the blisters.

In effecting opening of the container wall of this invention by means of the integral opening device, it is desirable to have the protective layer 44 fracture under or adjacent the score line 54 in order to facilitate ready access to the container contents. This may be accomplished by effecting adhesive bonding of the protective layer 44 to the container wall 40 in such a fashion that the bond therebetween exceeds the strength of the protective layer 44 in the regions adjacent to and underlying the score line 54. It is noted that the reduction in thickness of the protective layer 44 in the regions underlying score line 54 through compressively induced flow established during scoring contributes to the reduction in strength of the protective layer 44 in these regions. This facilitates severance along these regions during fracture of the score line 54 without requiring an additional independent effort such as would be required were the adhesive to release the bond and permit separation of the score defined removable sector from the underlying portion of the protective layer 44. An independent effort would then be required in order to sever the intact protective layer 44 before access could be had to the container contents.

In establishing the laminate of this invention a metal sheet is provided with an adhesively bonded layer of the protective material 44, which may be applied either as a coating or as a film. The use of a film is preferred as it facilitates ease of handling and joinder. It will generally be preferred to effect this bonding while the metal sheet 40 is in the form of a large sheet-like element out of which a number of container walls will be severed. For convenience of description, the term "metal sheet" and words of similar import, as employed herein shall refer to an enlarged metal sheet out of which a number of container walls may be severed as well as individual elements which are either container wall blanks, container walls in process or completed container walls. In the preferred form of the invention, lamination of a protective layer 44 in the form of a film to the container wall 40 will be effected at a metal temperature of about 180° to 300°F, with about 190° to 220°F being the preferred range. At metal sheet temperatures under about 180°F sufficient adhesion is not obtained and over about 190°F superior adhesion is obtained. At metal sheet temperatures in excess of about 220°F some film softening occurs with excessive softening occurring at about 300°F.

In order to facilitate improved adhesion between the protective layer 44 and container wall 40 it is desirable when a film is employed, to subject the protective layer 44 to electrostatic treatment in a known manner. See U.S. Pat. Nos. 3,454,461 and 3,575,762, for example. Such treatment involves passing the film through a high frequency corona discharge between an electrode and a ground. This causes a reaction on the surface of the film and establishes a polarization of the molecules on the surface of the film.

In order to verify the effectiveness of the method of providing a laminated end structure of this invention as well as the quality of the resulting product, a series of severe tests were performed in an effort to determine the extent of resistance to failure under extreme conditions. The following examples, which present the results of these tests, as well as evidence of the inadequacy of present commercial practices, confirmed the effectiveness of the present invention.

EXAMPLE 1

In order to evaluate the product of conventional practices, several sheets of an aluminum base magnesium alloy (5052) in the extra hard H19 temper having a thickness of about 0.010 inch were coated on both sides with an epoxy phenolic resin by means of a solvent which was subsequently evaporated. The coating was cured by heating the panels at 400°F for a period of 10 minutes. Circular panel portions were then blanked from the sheet and converted into can ends. The can ends were subsequently scored in the conventional manner to define a removable panel sector. Careful examination of the scored can ends revealed fractured portions of the epoxy phenolic coatings which would not have been acceptable for ordinary commercial use without the application of a repair coating in order to cure the defects established by the scoring operation.

EXAMPLE 2

In order to test the permeability of the protective film and the resistance to blister formation, several tests were performed. A number of can ends were made from sheets of an aluminum base magnesium alloy in the extra hard H19 temper (5151–H19). The sheets had a gauge of about 0.010 inch and were coated on one side with a clear epoxy amine coating and on the other side with a polyurethane adhesive in the amount of 3 mg/sq. in. A homopolymer polypropylene film having a thickness of about 3 mils was employed on the specimens of Series A and C, while a 3 mil copolymer of polypropylene and 3 percent ethylene, by weight, was employed in the Series B specimens. The films were electrostatically treated prior to lamination in order to improve adhesion. A first portion ($A_1$, $B_1$) of the Series A and B specimens, respectively, were laminated at a metal temperature of about 190°F and a second portion ($A_2$, $B_2$) of the Series A and B specimens were laminated at a metal temperature of about 220°F. The Series C specimens were also laminated at about 220°F. Can end blanks were severed from the specimens and the blanks were scored and provided with integral rivets securing a lever pull tab in a conventional fashion, except that no repair coating was employed on the film covered surface of the ends after scoring. Bare tinplate can bodies were employed in order to increase the likelihood of galvanic corrosion should perforations or excess permeability develop in the protective film. The cans were filled with tomato soup at a temperature of about 195°F. Tomato soup was selected as it is considered to be a difficult product to hold as it has substantial corrosive properties. The laminated can ends were double seamed to the can bodies in a conventional fashion. The sealed cans were retorted at 240°F for 50 minutes and were subsequently pressure cooled at about 10 psi. After one month storage at 100°F one dozen cans of each series of can ends were opened without destroying the integrity of the laminated can ends. The dozen Series $B_1$ ends (copolymer laminated at 190°F) exhibited no evidence of excess permeability and were totally devoid of blisters. The Series $B_2$ ends (copolymer laminated at 220°F) had a single end out of the 12 which had minor evidence of blistering. Under the same severe testing the Series $A_1$ (homopolymer laminated at 190°F), Series $A_2$ (homopolymer laminated at 220°F) and Series C (homopolymer laminated at 220°F) ends had one, two and eight ends out of a dozen ends, respectively, exhibiting minor blistering. This test, therefore, demonstrates the superiority of the copolymer over the homopolymer of the same thickness in respect of stress crack resistance which is related to resistance to permeability and blister formation. This is particularly noteworthy in that the homopolymer is a known acceptable alternative to the prior approach employing repair coating after scoring and the severe conditions under which the tests were performed.

EXAMPLE 3

Two types of laminated container walls were employed in tests substantially similar to those of Example 2, except that the can bodies were coated in a conventional fashion. A copolymer of polypropylene and 5 percent, by weight, ethylene was provided in film form. This film was laminated to sheets of 5151-H19 aluminum alloy by means of a polyurethane adhesive which had an epoxy additive. The first series of ends (Series D) had a film of 2 mil thickness, while the second series (Series E) had a film thickness of 3 mils. The containers were filled with tomato soup and were sealed and processed as in Example 1. A portion of each series of sealed containers was stored for a period of one month and a second portion of each series was stored for a period of three months. With respect to each type of end within each storage period, a first group was stored at 75°F and a second group was stored at 100°F. After storage, all of the sealed cans were opened for inspection without disturbing the end integrity. The Series E film (3 mil) exhibited no visible perforations in either the 56 ends which were stored at 75°F for one month or the 20 ends which were stored for 1 month at 100°F. The Series D film (2 mil) exhibited no visible perforations in the 91 ends which were stored for 1 month at 75°F. The same was true of the 20 Series D ends which were stored for 3 months at 100°F. With respect to the 3 month storage of the Series E film (3 mil), under these severe test conditions none of the 56 ends stored at 75°F and only one of the 14 ends stored at 100°F exhibited any visible evidence of perforation. With respect to the Series D films (2 mil), two of the 91 ends stored at 75°F for a period of 3 months and one of the 15 ends stored at 100°F exhibited perforations. None of the sealed containers exhibited hydrogen swelling, which would have indicated that corrosive attack upon the metal end and/or food spoilage had occurred. By way of comparison with the previously known, acceptable homopolymer polypropylene laminated end, it is noted that under the same conditions the 2 mil homopolymer had eight ends containing perforations out of 144 stored at 75°F for three months and five perforated ends out of 30 stored at 100°F for 3 months. The 2 mil homopolymer contained no visible perforations in the 44 ends stored for one month at 75°F or in the 40 ends stored at 100°F for one month. No visible perforations were present in the 59 3 mil homopolymer ends stored at 75°F for one month or the 59 ends stored at 75°F for 3 months. Also, no visible perforations were present in the 3 mil homopolymer with respect to the twenty ends stored at 100°F for 1 month or the 15 ends stored at 100°F for 3 months. It would appear, therefore, that the performance of the 3 mil copolymer approximates that of the 3 mil homopolymer, while both the 2 and 3 mil copolymer performance exceeded the performance of the 2 mil homopolymer.

EXAMPLE 4

The severe tests performed in connection with Example 3 were repeated employing uncoated can stock in order to provide an additional element of acceleration in the tests. A first series of laminated ends (Series F) employed the 2 mil polypropylene-5 percent ethylene copolymer and the second series (Series G) of ends employed the 3 mil polypropylene-5 percent ethylene copolymer. With respect to the Series G ends (3 mil copolymer) the thirty sealed cans which were stored at 75°F for one month revealed no visible evidence of perforation. The twenty Series G ends which were stored at 100°F for one month also failed to reveal any visible evidence of perforation. The Series G ends had no visible evidence of perforation in connection with the 30 ends which were stored at 75°F for 3 months. The same was true of the fifteen ends which were stored at 100°F for three months. In connection with the Series F ends (2 mil copolymer) only one end out of the 62 which were stored at 75°F for one month contained evidence of perforation and only one of the 20 which were stored at 100°F for one month exhibited such evidence. With respect to the Series F ends which were stored for 3 months, only two of the 61 ends stored at 75°F showed evidence of perforation and none of the 14 ends stored at 100°F exhibited any visible evidence of perforation. By way of contrast, it is interesting to note that of the 90 polypropylene 2 mil homopolymer ends stored at 75°F for one month under these conditions, nineteen had visible evidence of perforation and of the 40 2 mil homopolymer ends stored at 100°F, nine had visible evidence of perforations. Similarly, of the 71 2 mil homopolymer ends stored at 75°F for three months, seven had visible evidence of perforation and one of the 25 2 mil homopolymer ends stored at 100°F for three months had visible evidence of perforation. With respect to the 3 mil homopolymer ends, one of 51 stored at 75°F and none of the twenty stored at 100°F exhibited visible perforations. With respect to 3 month storage, three of the 50 3 mil homopolymer ends exhibited visible evidence of perforation, while none of the 15 stored at 100°F exhibited perforation. It would appear, therefore, that the 3 mil copolymer (Series G) ends exhibited the best performance under these severe accelerated test conditions and that the 2 mil copolymer (Series F) was substantially equal to the 3 mil homopolymer end and better than the 2 mil homopolymer in performance.

While for convenience of reference the term "score line" and similar terms have been used herein, it will be appreciated that the removable sector may be defined by a single score line, a number of score lines or one or more weakened lines established in another fashion and the use herein of the term "score line" and words of similar import shall include both single and multiple scored or weakened lines which serve to provide a removable sector.

It will, therefore, be appreciated that the present invention provides a method of fabricating a laminated container wall structure which possesses an integral opening device and is adapted to resist the severe mechanical forces applied during conversion of the plain metal wall into the final container wall construction. All of this is facilitated by the use of either a specific copolymer of polyolefin and ethylene or ionomers of a polyolefin. The protective layer is effectively bonded to the undersurface of the metal sheet in such a fashion as to avoid either fracture or excessive thinning of the protective layer during scoring, rivet forming and staking, and other container wall forming operations. Avoidance of perforations and blistering is effected without the need for investment in additional limited use equipment or departure from conventional container wall fabricating practices. In this fashion, galvanic corrosion as well as corrosive attack on the metal panel by the contents of the sealed container are effectively prevented, while eliminating the need for any reconstructive operations such as repair coating. The construction of the laminated wall of this invention is such that it will provide a single effective protective laminated wall construction adapted for use with a wide range of products including highly corrosive food products. It also avoids deleterious effects upon the properties of food products sealed within such a container resulting from deterioration of the container wall. Finally, it is noted that all of this is accomplished while preserving desired ease of opening characteristics. As the protective layer preferably severs automatically when the removable sector is opened, no awkward independent severance of the underlying protective layer after the container opening device is operated to open the removable sector is required.

Whereas particular embodiments of the invention have been described above for purposes of illustration, it will be evident to those skilled in the art that numerous variations of the details may be made without departing from the invention as defined in the appended claims.

We claim:

1. A laminated metal container wall comprising
   a metal panel having a score line defined removable sector,
   an adhesive material secured to one surface of said metal panel,
   a continuous layer of protective material substantially coextensive with and secured to said metal panel by means of said adhesive,
   said protective material selected from the group consisting of a copolymer of a polyolefin and ethylene with an ethylene content by weight of about 1 to 10 percent and ionomers of polyolefin, and
   said protective material having a thickness of about 1.5 to 4 mils in regions not underlying said score line.

2. The laminated container wall of claim 1 including
   said metal panel having a residual thickness of about 2 to 6 mils in said scored regions,
   said protective material having a film thickness of about 2.5 to 3.5 mils in regions not underlying said score line,
   said protective material having a reduced thickness in the regions underlying said score line,
   said protective material is selected from the group consisting of a copolymer of a polyolefin and ethylene with an ethylene content by weight of about 2 to 5% and polyethylene acrylate, and
   said adhesive selected from the group consisting of epoxy, polyester and polyurethane.

3. The metal container wall of claim 2 including said adhesive being a coating of about 1.0 to 5.0 milligrams per square inch, and
   said protective material is a copolymer of polypropylene and ethylene with an ethylene content by weight of about 2 to 5 percent.

4. The metal container wall of claim 3 including said adhesive being a coating of 1.0 to 3.0 milligrams per square inch, and
   said protective material within regions underlying said score line having a thickness of about 10 to 50 percent less than the average thickness of the remainder of said protective material.

* * * * *

UNITED STATES PATENT OFFICE
CERTIFICATE OF CORRECTION

Patent No. 3,747,797      Dated July 24, 1973

Inventor(s) Herbert Gayner et al

It is certified that error appears in the above-identified patent and that said Letters Patent are hereby corrected as shown below:

| | |
|---|---|
| In the Abstract, next to the last line | Change "and" to --of--. |
| Col. 5, line 19 | After "the" delete "layer of". |
| Col. 6, lines 46 and 47 | After "to" change "function as a galvanic anode" to --create a galvanic cell--. |
| Col. 6, line 55 | After "that" change "the" to --of--. |

Signed and sealed this 12th day of March 1974.

(SEAL)
Attest:

EDWARD M. FLETCHER, JR.
Attesting Officer

C. MARSHALL DANN
Commissioner of Patents